(12) United States Patent
Yip et al.

(10) Patent No.: US 7,017,082 B1
(45) Date of Patent: Mar. 21, 2006

(54) METHOD AND SYSTEM FOR A PROCESS MANAGER

(75) Inventors: Mike Yip, Sunnyvale, CA (US); Anna Berenberg, Los Alos, CA (US)

(73) Assignee: Extreme Networks, Santa Clara, CA (US)

( * ) Notice: Subject to any disclaimer, the term of this patent is extended or adjusted under 35 U.S.C. 154(b) by 492 days.

(21) Appl. No.: 10/170,246

(22) Filed: Jun. 11, 2002

Related U.S. Application Data

(63) Continuation of application No. 10/157,567, filed on May 28, 2002.

(51) Int. Cl.
*G06F 11/00* (2006.01)

(52) U.S. Cl. .......................................... 714/38; 714/51
(58) Field of Classification Search .................. 714/38, 714/51, 704, 709
See application file for complete search history.

(56) References Cited

U.S. PATENT DOCUMENTS

| | | | | |
|---|---|---|---|---|
| 6,425,093 B1 * | 7/2002 | Singh et al. ................... | 714/38 |
| 6,453,430 B1 * | 9/2002 | Singh et al. ................... | 714/47 |
| 6,662,310 B1 * | 12/2003 | Lopez et al. ................... | 714/15 |
| 6,665,758 B1 * | 12/2003 | Frazier et al. ............... | 710/200 |
| 2002/0162053 A1 * | 10/2002 | Os ............................... | 714/38 |
| 2003/0037172 A1 * | 2/2003 | Lacombe et al. ........... | 709/310 |
| 2003/0074605 A1 * | 4/2003 | Morimoto et al. ............ | 714/38 |
| 2004/0054984 A1 * | 3/2004 | Chong et al. ................ | 717/103 |

* cited by examiner

*Primary Examiner*—Bryce P. Bonzo
(74) *Attorney, Agent, or Firm*—Blakely, Sokoloff, Taylor & Zafman LLP

(57) ABSTRACT

A method and system is provided for monitoring the health of processes running on a router. A behavior of a process is monitored and the process is killed if the behavior is abnormal. The behavior may be abnormal if the process is non-responsive, cannot start, or repeatedly crashes. The system may include a timer to measure a predetermined time interval for the process to perform a desired action, a counter to count a number of times the process fails to perform the desired action before the timer expires, and a controller to kill the process when the counter exceeds a maximum number of failures. Alternatively, the timer could measure an amount of uptime, the counter could count the number of times the process crashes, and the controller could kill the process when a crash rate calculated from the number of times the process crashes per the amount of uptime exceeds a maximum crash rate.

13 Claims, 8 Drawing Sheets

METHOD AND SYSTEM FOR A PROCESS MANAGER

The present patent application is a Continuation of prior application Ser. No. 10/157,567, filed May 28, 2002.

BACKGROUND

1. Technical Field

The invention relates to the field of network management. In particular, the invention relates to a process manager that monitors the health of processes running on a router.

2. Background Information and Description of Related Art

The architecture of high-performance Internet routers has advanced in the last several years to provide increased performance in routing ever-greater volumes of network traffic. It is not uncommon for a router to support numerous protocols as well as several applications for configuration and maintenance of the router tables, protocols, and network policies. These advances have increased the complexity of the router such that the management of applications and protocols running on the router is critical for reliable network performance.

In existing router management technology, the logic to support the applications, protocols, and associated management interfaces is centrally managed in a single master program. This can result in a single point of failure, meaning that even if there is a problem with only one protocol or application or interface, the entire program could crash, bringing the router down with it. In addition, if the master program needs to be updated, for example to accommodate a new protocol, then the master program must be brought down in order to perform the updates, thereby temporarily taking the router out of service.

In an effort to overcome some of the limitations in existing router management technology, management of applications, protocols, and associated management interfaces may be decentralized. However, this means that there will be several independent processes running simultaneously on both the active Router Protocol (RP) and line cards. These multiple processes share the resources of the processor on which they are running. Furthermore, processes often run multiple threads per process. These threads share the same address space and may be short or long-lived. Therefore, if any one process or any thread of a process is not healthy, it could be taking up valuable resources unnecessarily.

SUMMARY

According to one aspect of the invention, a method and system is provided to monitor the health of processes and to kill the process when the process is unhealthy. The system starts a process, monitors a behavior of the process, and kills the process when the behavior is abnormal.

According to one aspect of the invention, the behavior is abnormal when the process is non-responsive. The behavior of the process is monitored by setting a process timer after starting the process, registering the process and incrementing a timeout count when the process fails to register before the process timer expires, and polling the process and incrementing the timeout count when the process fails to respond to polling before the process timer expires. The process is killed when the timeout count exceeds a maximum number of timeouts.

According to one aspect of the invention, the behavior is abnormal when a thread of the process is non-responsive. The behavior of the process is monitored by setting up a thread timer for each thread of the process after registering the process, waiting for each thread to provide an updated status, and incrementing a corresponding thread timeout count when any of the threads fails to provide an updated status before the corresponding thread timer expires. The process is killed when any of the thread timeout counts exceeds a maximum number of timeouts.

According to one aspect of the invention, the behavior is abnormal when the process cannot start. The behavior of the process is monitored by setting a startup timer before starting the process and incrementing a startup count when the process fails to register before the startup timer expires. The process is killed when the startup count exceeds a maximum number of attempts at starting the process.

According to one aspect of the invention, the behavior is abnormal when the process repeatedly crashes. The behavior of the process is monitored by accumulating an amount of uptime for the process, incrementing a crash count when the process crashes, and calculating a crash rate from the crash count per the amount of uptime. The process is killed when the calculated crash rate exceeds a maximum crash rate.

According to one aspect of the invention, apparatus are provided to carry out the above and other methods.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION

In the following description various aspects of the present invention, a method and apparatus for process management will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a switch, router, bridge, server or gateway, as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, packets, messages, tables, command, message information base, command trees, tags and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

It should be noted that while the description that follows addresses the method and apparatus as it applies to a network device such as a router, or layer 3 switch, it is appreciated by those of ordinary skill in the art that method is generally applicable to any packet forwarding device, including a bridge (layer 2 switch), server or gateway. It should also be noted that while the method and apparatus may be discussed in the context of a local area network (LAN), the present invention may also be used in the context of other Transport Control Protocol/Internet Protocol (TCP/IP)-based networks including, but not limited to, internetworks, Virtual Local Area Networks (VLANs), Metropolitan Area Networks (MANs), and Wide Area Networks (WANs), as well as networks organized into subnets.

Figure 1:
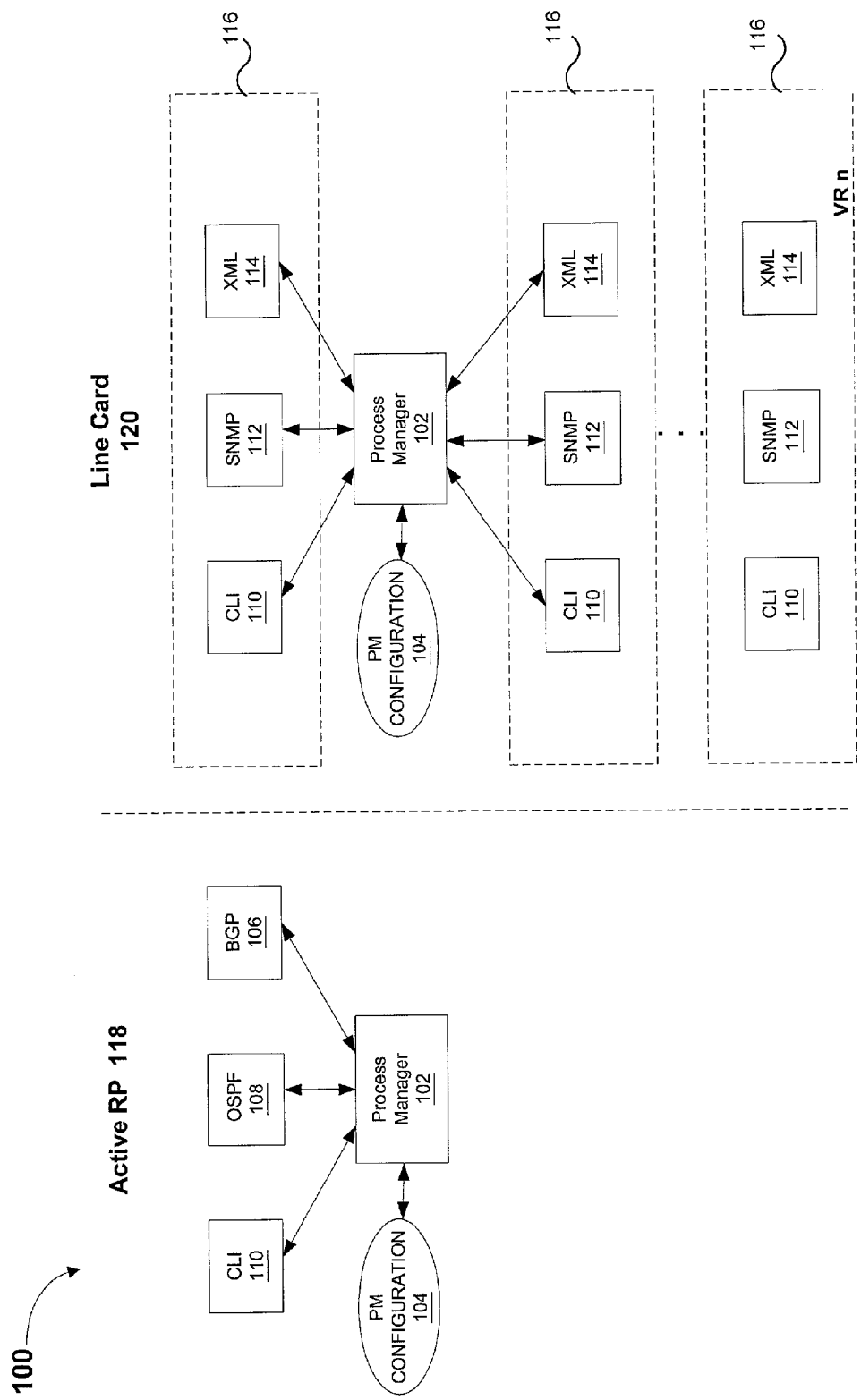
FIG. 1 illustrates is a block diagram illustrating one generalized embodiment of a process management system incorporating the invention, and the operating environment in which certain aspects of the illustrated invention may be practiced.

FIG. 1 is a block diagram illustrating one generalized embodiment of a process management system 100 incorporating the invention, and the operating environment in which certain aspects of the illustrated invention may be practiced. The system 100 is shown to be operating in an active Route Processor (RP) card and a line card running multiple virtual routers. Those of ordinary skill in the art will appreciate that the system 100 may include more components than those shown in FIG. 1. However, it is not necessary that all of these generally conventional components be shown in order to disclose an illustrative embodiment for practicing the invention. As illustrated, the process management system 100 operates on a router that has a process manager 102.

A typical router supports a number of applications that support protocols, network interfaces, and other components, the operation of which is maintained by the process manager 102. For example, in the illustrated embodiment, the router includes applications to support the Border Gateway Protocol (BGP) 106 and the Open Shortest Path First protocol (OSPF) 108.

Each application may also support one or more management interfaces, such as command line interface (CLI) 110, Simple Network Management Protocol (SNMP), or Extensible Markup Language (XML) based management interfaces. The management interfaces provide network administrators with access to the functions of the router and router applications using CLI commands, or SNMP or XML requests to update or access configuration of the process manager.

Figure 2:
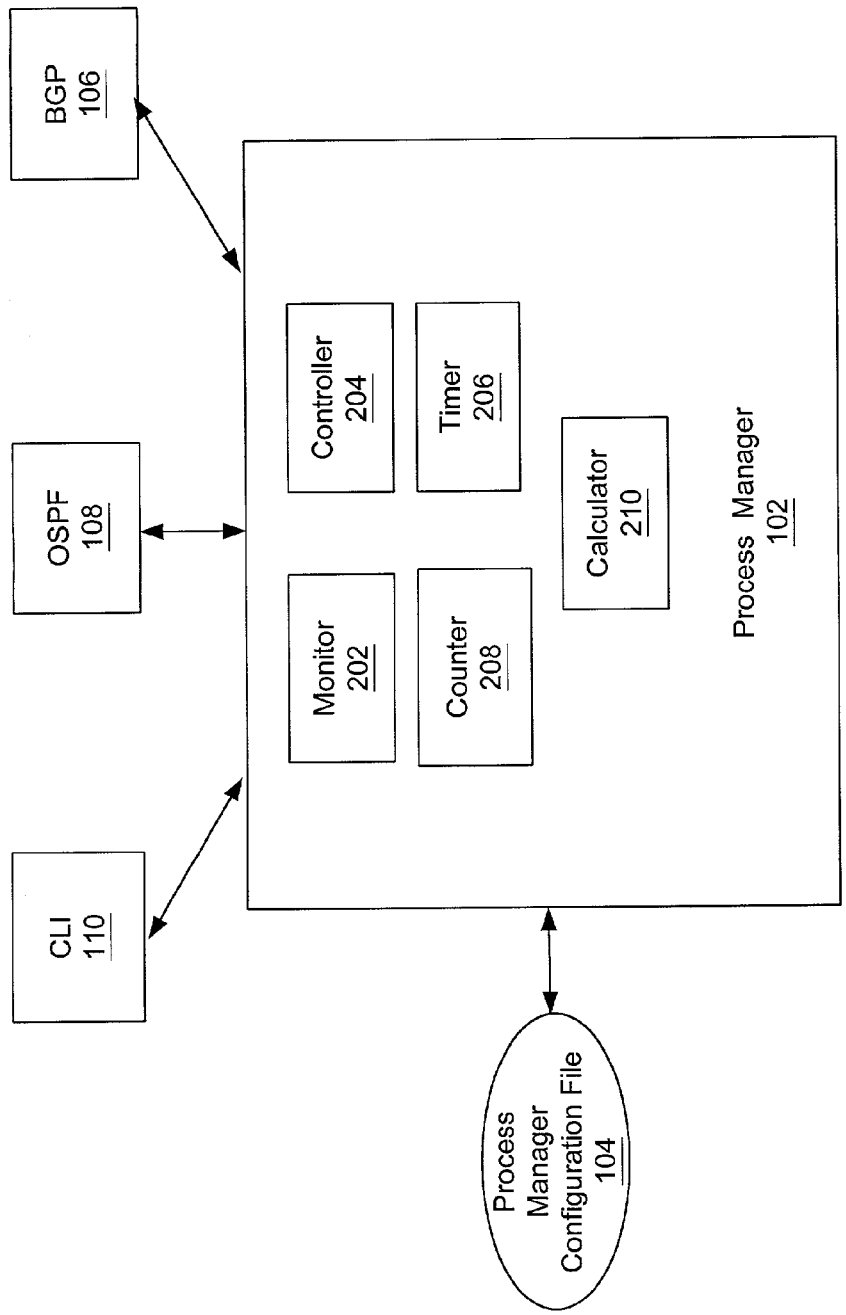
FIG. 2 is a block diagram illustrating selected components of the process management system of FIG. 1 in further detail, in accordance with one embodiment of the invention.

FIG. 2 is a block diagram illustrating selected components of the process management system of FIG. 1 in further detail. The process manager 102 uses a configuration file 104 to allow the process manager to be configurable to set various options. The configuration file 104 may be implemented in various formats, such as a flat file, a CLI, or an XML file.

Process manager 102 includes a process monitor 202 to monitor a behavior of a process and a controller 204 to control the process and kill the process when the behavior is abnormal. In one embodiment, the process manager 102 includes one or more timers 206. One timer may measure a predetermined time interval for a process to perform a desired action, such as responding to polling or registering the process upon startup. Another timer may measure the amount of uptime for the process. In one embodiment, the process manager 102 includes one or more counters 208. One counter may count a number of times a process fails to perform the desired action during the predetermined time interval. In one embodiment, the controller 204 kills a process when the counter exceeds a maximum number of failures. Another counter may count the number of times a process crashes. The process manager 102 may further include a calculator 210 to measure a crash rate from the number of times a process crashes per the amount of uptime. In one embodiment, the controller 204 kills a process when the calculated crash rate exceeds a predetermined maximum crash rate. The configuration file 104 may be used to set the predetermined time interval, maximum number of failures, maximum crash rate, or other configurable options.

Figure 3:
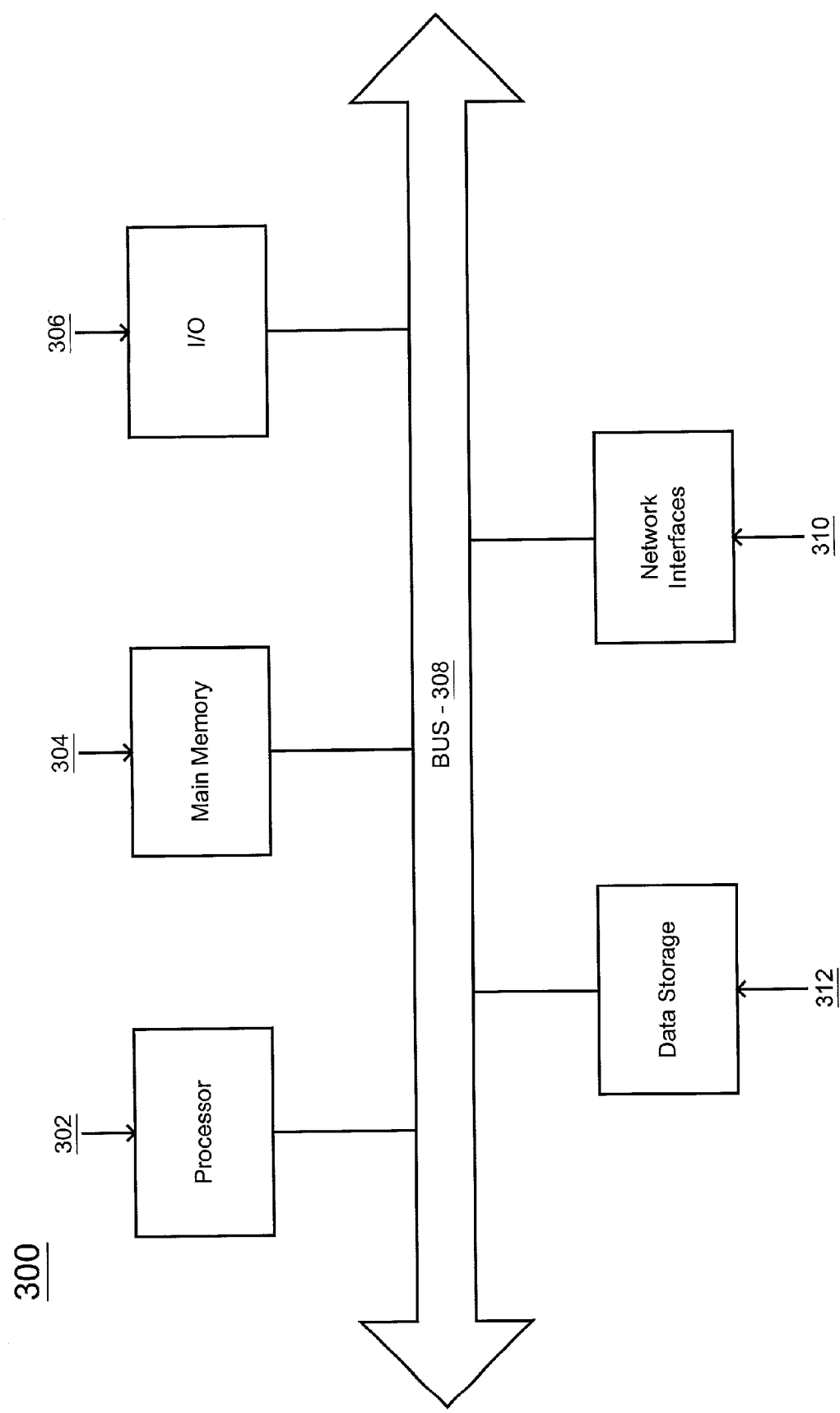
FIG. 3 is a block diagram illustrating a suitable computing environment in which certain aspects of the illustrated invention may be practiced.

FIG. 3 is a block diagram illustrating a suitable computing environment in which certain aspects of the illustrated invention may be practiced. In one embodiment, the method for a process management system 100 may be implemented on a computer system 300 having components 302–312, including a processor 302, a memory 304, an Input/Output device 306, a data storage 312, and a network interface 310, coupled to each other via a bus 308. The components perform their conventional functions known in the art and provide the means for implementing the process management system 100. Collectively, these components represent a broad category of hardware systems, including but not limited to general purpose computer systems and specialized packet forwarding devices. It is to be appreciated that various components of computer system 300 may be rearranged, and that certain implementations of the present invention may not require nor include all of the above components. Furthermore, additional components may be included in system 300, such as additional processors (e.g., a digital signal processor), storage devices, memories, and network or communication interfaces.

Figure 4:
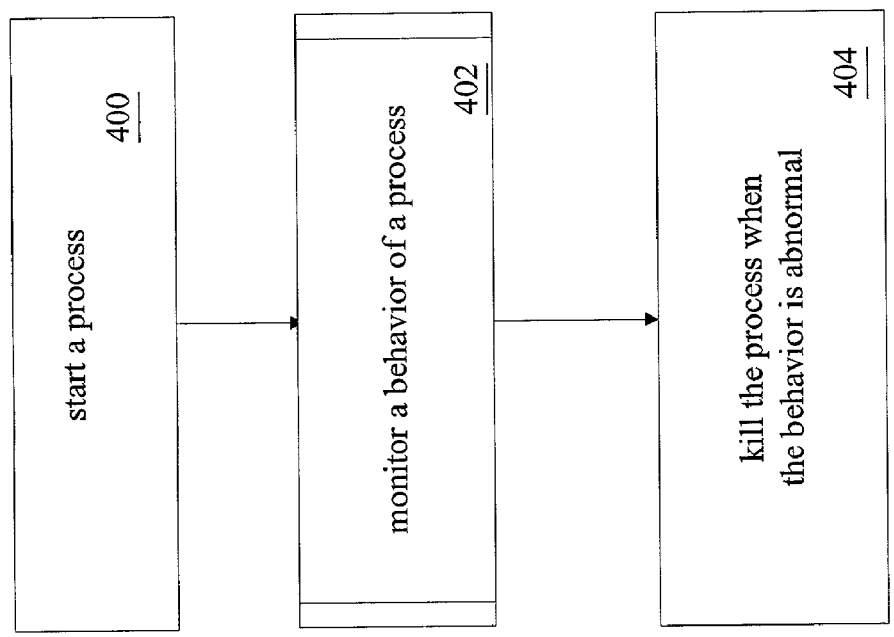
FIG. 4 is a flow diagram illustrating certain aspects of a method to be performed by a computer executing one embodiment of the illustrated invention.

FIG. 4 is a flowchart illustrating certain aspects of a method to be performed by a computer executing one embodiment of the invention. The methods to be performed by a processor on a router or other network device constitute computer programs made up of computer-executable instructions. Describing the methods by reference to a flowchart enables one skilled in the art to develop such programs including such instructions to carry out the methods on suitably configured computers, in which the processor of the computer execute the instructions from computer-accessible media. The computer-executable instructions may be written in a computer programming language or may be embodied in firmware logic such as an application-specific integrated circuit (ASIC). If written in a programming language conforming to a recognized standard, such instructions can be executed on a variety of hardware platforms and for interface to a variety of operating systems. In addition, the invention is not described with reference to any particular programming language. It will be appreciated that a variety of programming languages may be used to implement the teachings of the invention as described herein. Furthermore, it is common in the art to speak of software, in one form or another, for example a program, procedure, process, or application, as taking an action or causing a result. Such expressions are merely a shorthand way of saying that execution of the software by a computer causes the processor of the computer to perform an action or a produce a result.

The method begins at 400, where a process is started. The process may be running in any of the applications, protocols, or management interfaces managed by process manager 102. At 402, a behavior of the process is monitored. At 404, the process is killed when the behavior is abnormal. In one embodiment, an administrator is notified about the abnormal behavior.

Figure 5:
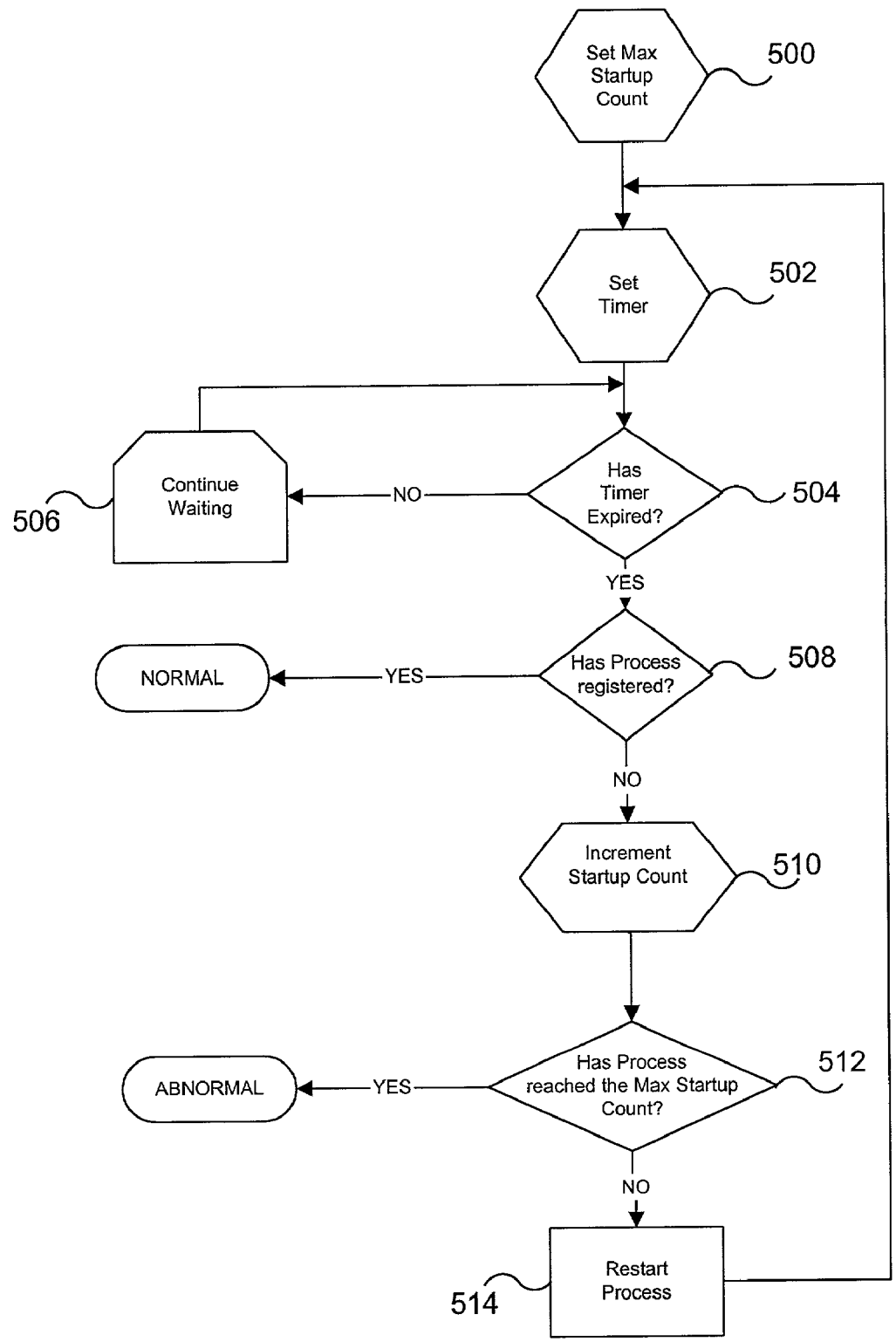
FIG. 5 is a flow diagram illustrating one embodiment of monitoring a behavior of a process in further detail.

FIG. 5 is a flowchart illustrating one embodiment of monitoring a behavior of a process in further detail. At 500, a maximum startup count is set to define a maximum number of startup attempts for the process. At 502, a startup timer is set to define a time interval to wait for the process to startup and register. At 504, the process manager 102 determines whether the timer has expired. When the timer has not yet expired, the waiting continues at 506 until the timer expires. When the timer expires, at 508, the process manager 102 determines whether the process has registered. When the process has registered, the behavior of the process is normal. When process has not registered when the timer expires, at 510, the startup count is incremented. Then, at 512, the process manager 102 determines whether the process has reached the maximum startup count. When the process has not yet reached the maximum startup count, then the process is restarted at 514, and the method is reiterated from 502. When the process has reached the maximum startup count, then the behavior of the process is abnormal, and the process is killed. Internal process control data may then be cleaned up and an administrator may be notified about the inability to start the process.

Figure 6:
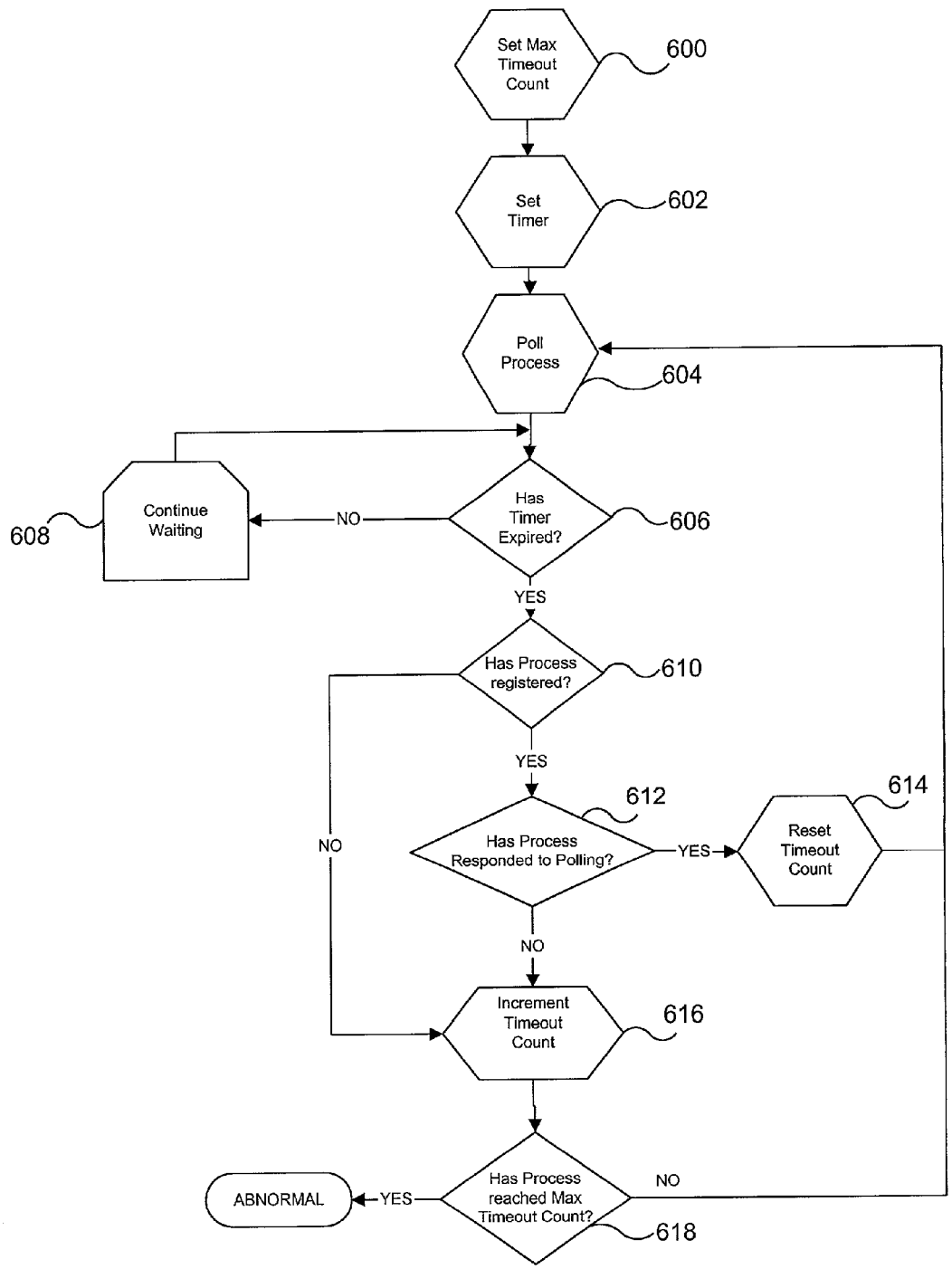
FIG. 6 is a flow diagram illustrating an alternative embodiment of monitoring a behavior of a process in further detail.

FIG. 6 is a flowchart illustrating an embodiment of monitoring a behavior of a process in further detail. At 600, a maximum timeout count is set to define a maximum number of timeouts for the process. At 602, a timer is set to define a time interval to wait for the process to respond to polling. At 604, the process is polled. An example of polling is to send a "hello" message to the process. The process may reply by sending a "hello acknowledgment" message. At 606, the process manager 102 determines whether the timer has expired. When the timer has not yet expired, the waiting continues at 608 until the timer expires. When the timer expires, at 610, the process manager 102 determines whether the process has registered. When the process has registered, at 612, the process manager 102 determines whether the process has responded to polling. When the process has responded to polling, at 614, the timeout count is reset, and the method is reiterated from 604. When the process has not registered or the process has not responded to polling when the timer expires, at 616, the timeout count is incremented. Then, at 618, the process manager 102 determines whether the process has reached the maximum timeout count. When the process has not yet reached the maximum timeout count, the method is reiterated from 604. When the process has reached the maximum timeout count, then the behavior of the process is abnormal, and the process is killed.

Figure 7:
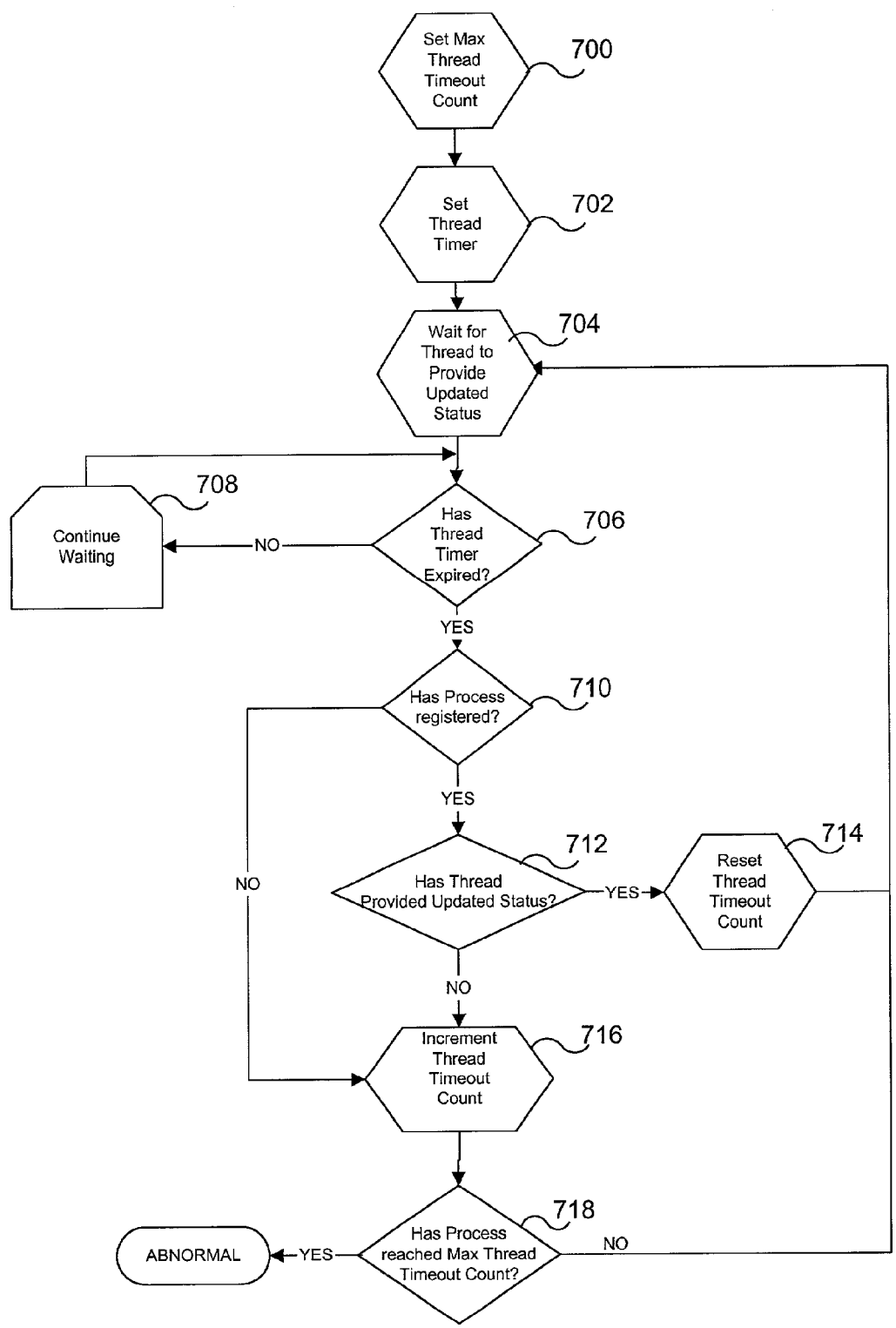
FIG. 7 is a flow diagram illustrating another alternative embodiment of monitoring a behavior of a process in further detail.

FIG. 7 is a flowchart illustrating an embodiment of monitoring a behavior of a process in further detail. At 700, a maximum thread timeout count is set to define a maximum number of timeouts for the threads of the process. At 702, a thread timer is set for each thread in the process to define a time interval to wait for each thread to provide an updated status. At 704, the process manager 102 waits for each thread to provide an updated status. At 706, the process manager 102 determines whether the corresponding thread timer has expired. When the timer has not yet expired, the waiting continues at 708 until the timer expires. When the timer expires, at 710, the process manager 102 determines whether the process has registered. When the process has registered, at 712, the process manager 102 determines whether the thread has provided an updated status. When the thread has provided an updated status, the corresponding thread timeout count is reset at 714, and the method is reiterated from 704. When the process has not registered or the thread has not provided an updated status when the timer expires, at 716, the corresponding thread timeout count is incremented. Then, at 718, the process manager 102 determines whether the thread of the process has reached the maximum thread timeout count. When the thread has not yet reached the maximum thread timeout count, the method is reiterated from 704. When the thread has reached the maximum thread timeout count, then the behavior of the process is abnormal, and the process is killed.

Figure 8:
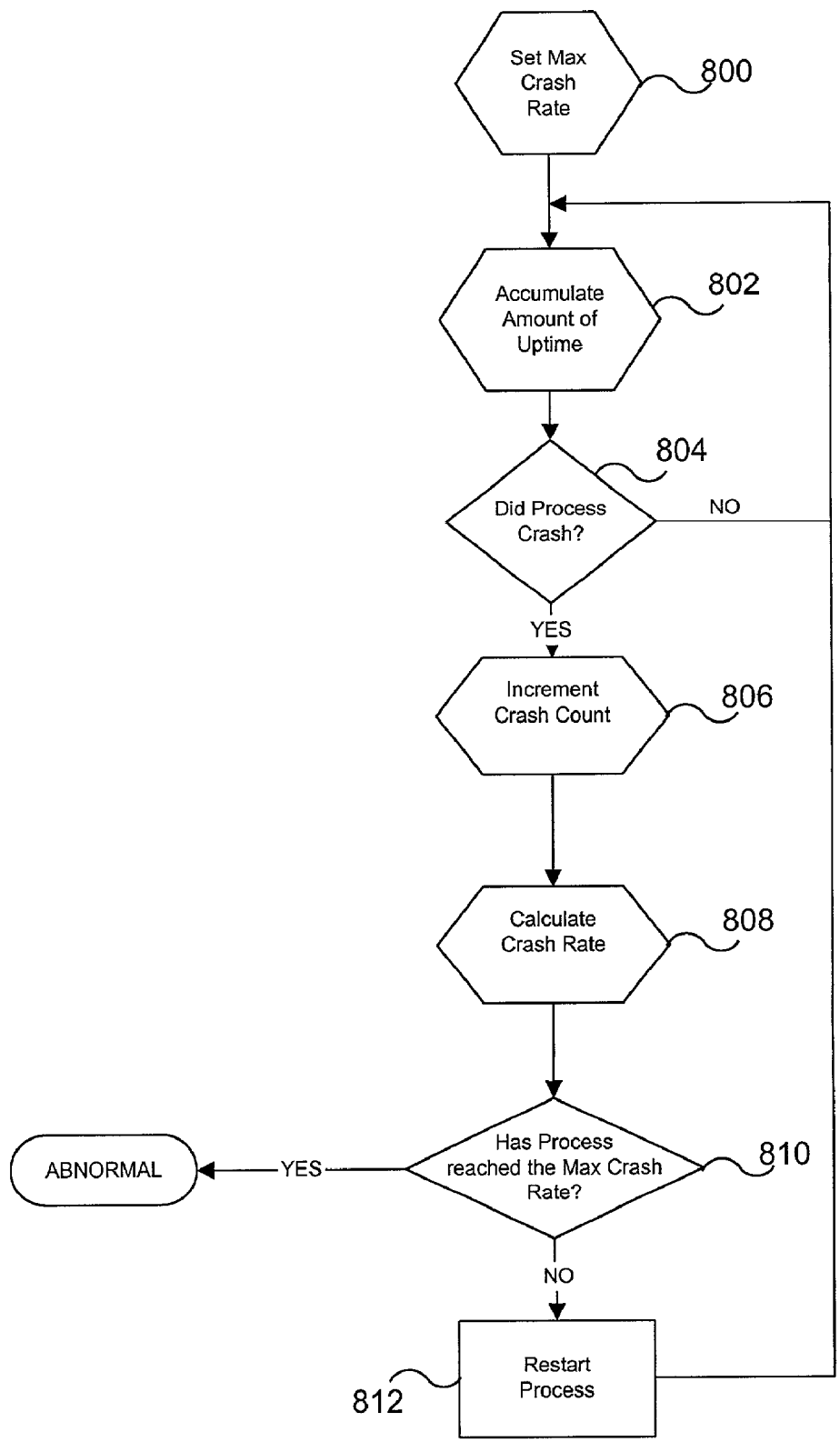
FIG. 8 is a flow diagram illustrating yet another alternative embodiment of monitoring a behavior of a process in further detail.

FIG. 8 is a flowchart illustrating one embodiment of monitoring a behavior of a process in further detail. At 800, a maximum crash rate for the process is set. At 802, the amount of uptime for the process is accumulated. At 804, the process manager 102 determines whether the process has crashed. When the process has not crashed, the method is reiterated at 802. When the process crashes, at 806, the crash count is incremented. Then, at 808, the crash rate is calculated from the crash count per the amount of uptime. Then, at 810, the process manager 102 determines whether the process has reached the maximum crash rate. When the process has not yet reached the maximum crash rate, the process is restarted at 812, and the method is reiterated from 802. When the process has reached the maximum crash rate, the behavior of the process is abnormal, and the process is killed. Internal process control data may then be cleaned up and an administrator may be notified about the inability to start the process.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment, the system 100 may be connected to a network, and the content may be stored on any device in the network.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    starting a process;
    accumulating an amount of uptime for the process;
    incrementing a crash count when the process crashes;
    calculating a crash rate from the crash count per the amount of uptime; and
    killing the process when the calculated crash rate exceeds a maximum crash rate.

2. The method of claim 1, further comprising attempting to restart the process when the process crashes if the crash rate does not exceed the maximum crash rate.

3. The method of claim 1, further comprising cleaning up internal process control data and notifying an administrator when the crash rate exceeds a maximum crash rate.

4. A method comprising:
    starting a process;
    setting a process timer;
    polling the process;
    incrementing a timeout count when the process fails to respond to polling before the process timer expires; and
    killing the process when the timeout count exceeds a maximum number of timeouts.

5. The method of claim 4, further comprising resetting the timeout count each time the process responds to polling.

6. The method of claim 4, wherein polling the process and incrementing the timeout count when the process fails to respond to polling before the process timer expires comprises sending a message to the process and incrementing the timeout count when the process fails to reply to the sent message before the process timer expires.

7. The method of claim 6, further comprising resetting the timeout count each time the process replies to the sent message.

8. A method comprising:
    starting a process wherein the process comprises a plurality of threads;
    setting a thread timer for each of the plurality of threads of the process;
    waiting for each thread to provide an updated status;
    incrementing a corresponding thread timeout count when any of the threads fails to provide an updated status before the corresponding thread timer expires; and
    killing the process when any of the thread timeout counts exceeds a maximum number of timeouts.

9. The method of claim 8, further comprising incrementing the timeout counts when the process fails to register before any of the thread timers expire.

10. The method of claim 8, further comprising incrementing the timeout counts when the process fails to send a message before any of the thread timers expire.

11. The method of claim 8, further comprising resetting the thread timeout count each time a corresponding thread provides an updated status.

12. An apparatus comprising:
    a process monitor to monitor a behavior of a process;
    a timer to measure an amount of uptime;
    a counter to count the number of times the process crashes;
    a calculator to measure a crash rate from the number of times the process crashes per the amount of uptime; and
    a controller to kill the process when the calculated crash rate exceeds a predetermined maximum crash rate.

13. An article of manufacture comprising a machine accessible medium including content that when accessed by a machine causes the machine to:
    start a process;
    accumulate an amount of uptime for the process;
    increment a crash count when the process crashes;
    calculate a crash rate from the crash count per the amount of uptime; and
    kill the process when the crash rate exceeds a maximum crash rate.

\* \* \* \* \*